(No Model.) 2 Sheets—Sheet 1.
W. R. DUNKEL.
GRAIN WEIGHING AND REGISTERING APPARATUS.
No. 346,272. Patented July 27, 1886.
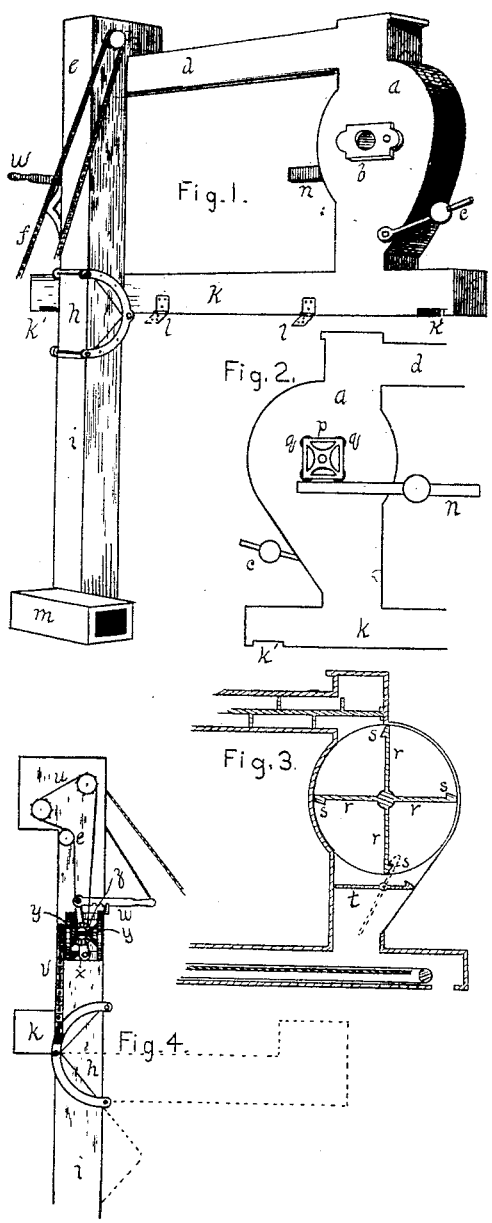
Witnesses.
J. N. Bills
R. L. Marshall
Inventor
W. R. Dunkel.
By L. P. Graham atty.

(No Model.) 2 Sheets—Sheet 2.

W. R. DUNKEL.
GRAIN WEIGHING AND REGISTERING APPARATUS.

No. 346,272. Patented July 27, 1886.

Witnesses
J. N. Bills
R. L. Marshall.

Inventor
W. R. Dunkel
By L. P. Graham
Atty.

UNITED STATES PATENT OFFICE.

WILBER R. DUNKEL, OF MACON, ILLINOIS.

GRAIN WEIGHING AND REGISTERING APPARATUS.

SPECIFICATION forming part of Letters Patent No. 346,272, dated July 27, 1886.

Application filed October 26, 1885. Serial No. 180,929. (No model.)

*To all whom it may concern:*

Be it known that I, WILBER R. DUNKEL, a resident of Macon, county of Macon, and State of Illinois, have invented certain new and useful Improvements in Mechanism for Determining and Registering the Weight of Grain, of which the following is a specification.

My invention consists in certain details of construction and combinations of parts, as hereinafter set forth and claimed.

Figure 5:
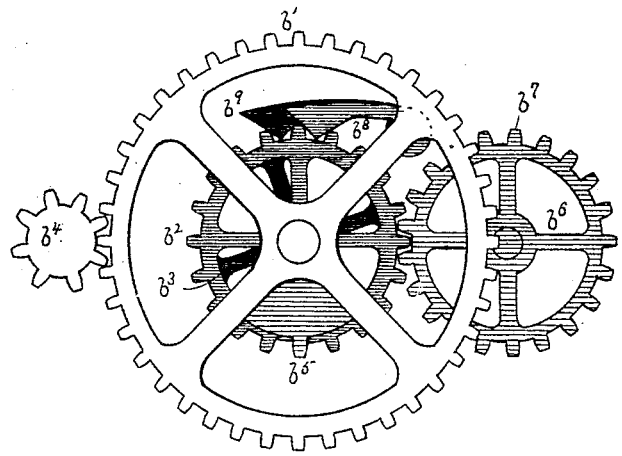
Figure 6:
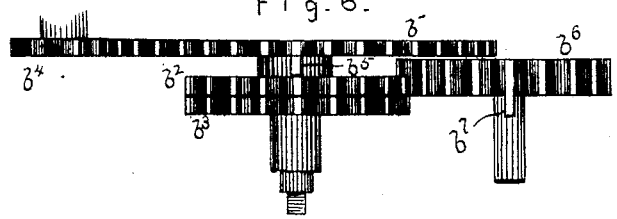
Figure 7:
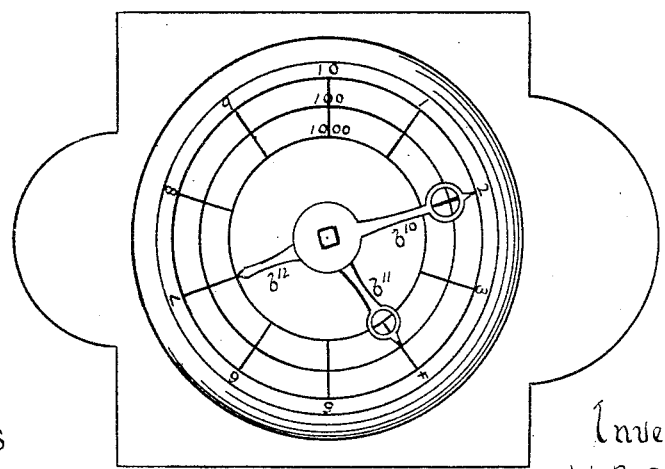

In the drawings accompanying and forming a part of this specification, Figure 1 is a perspective view of my machine. Fig. 2 is a side elevation of the weighing device, representing the side opposed to that shown in Fig. 1. Fig. 3 is a vertical section of the weighing device. Fig. 4 is an elevation of a side of the elevator-casing. Fig. 5 is an interior face view of the internal arrangement of the registering mechanism. Fig. 6 is an edge view of the same, and Fig. 7 shows the graduated dial-face and indicating-pointers.

$a$ is the casing for the weighing mechanism.

$b$ is the registering device.

$c$ is a weighted lever that forms a part of the weighing mechanism.

$d$ is a horizontal conveyer having a rotating screw.

$e$ is the upper and $i$ the lower portion of the grain-elevator.

$f$ and $u$ are chain belts.

$h$ is a triangular portion of the elevator, that swings into the position indicated by dotted lines in Fig. 4, to permit the upper part, $e$, to be laid in a horizontal position.

$k$ is a horizontal conveyer provided with a drag-belt, and adapted to be hinged to the top of a grain-separator.

$l$ $l$ represent hinges on conveyer $k$.

$m$ is a short chute that receives the grain from the separator-discharge.

$n$ is a scale-beam pivoted on casing $a$.

$p$ is a block on an end of the shaft of the grain-weighing receptacles.

$q$ are anti-friction rollers in the corners of block $p$.

$r$, Fig. 3, are radial partitions that divide the weighing-receptacle into quadrantal compartments.

$s$ are stops on said partitions, that co-operate with trip-plate $t$ to stop the rotation of the receptacle.

$t$ is a trip-plate, that, actuated by the falling grain, assumes the position indicated by the dotted lines and stops the motion of the weighing device at every discharge thereof.

$b'$, Figs. 5 and 6, shows a gear-wheel that receives motion through pinion $b^4$ from the axle of the rotating grain-receptacles.

$b^5$ is a tooth rigid with wheel $b'$ on the under side thereof.

$b^6$ is a broad-faced pinion that receives motion from tooth $b^5$ and imparts the same to wheel $b^2$.

$b^7$ is a tooth that imparts motion to $b^3$.

Wheels $b'$, $b^2$, and $b^3$ rotate independently of each other, and are provided with indicating-pointers $b^{10}$, $b^{11}$, and $b^{12}$, respectively.

$b^8$ and $b^9$ are pawls that operate on wheels $b^2$ and $b^3$, to prevent desultory motion therein.

The grain is received by chute $m$, which is connected with the discharge of the separator. Buckets in elevator $e$ $i$ convey said grain to screw-conveyer $d$, and said screw-conveyer discharges into weighing device $a$. The receptacle is held in the position indicated in Fig. 3 by the pressure of the scale-beam against block $p$, and when a sufficient amount of grain has accumulated in a compartment to overbalance the scale-beam, then a discharge will be effected by a quarter-revolution of the said receptacle. Weighted arm $c$ holds trip-plate $t$ horizontally across the discharge-spout of the grain-weighing device, and at each and every discharge of the receptacle the weight of the grain carries said plate into the position indicated by the dotted lines, thereby locking the receptacle, as shown. After an absolute stop has been effected by the trip-plate, as above described, the weighted arm $c$ causes said plate to assume its original position preparatory to another discharge. The grain falls from the weighing mechanism onto a drag-belt in conveyer $k$, and may be discharged from either end thereof, according to the direction given to the motion of the belt.

The mechanism preferred for the purpose of shifting the direction of the drag-belt is shown in Fig. 4, and consists in a combined sprocket-wheel and gear-pulley, $z$, on an oscillating bearing, lever $w$, adapted to adjust the position of pulley $z$, right and left pulleys $y\,y$, rigid on their shaft, and chain $v$, to convey the motion of pulleys $y\,y$ to the drag-belt of the conveyer.

The entire device, with the exception of the lower part of the elevator, is hinged to the top of a grain-separator when in operation, and to enable the same to be laid down when not in use portion $h$, of a triangular form, is made detachable, as indicated.

The rotation of wheel $b'$ is intermittently rotary in one direction, and its complete rotation consists in ten forward movements. Ten rotations of wheel $b'$ produce one rotation in wheel $b^2$, tooth $b^5$ and pinion $b^6$ being directly instrumental in effecting this result. Tooth $b^7$ on wheel $b^6$ produces a revolution in wheel $b^3$ for every ten revolutions in wheel $b^6$, and as a result of the complete arrangement pointer $b^{10}$ of wheel $b'$ indicates units on the dial-plate, pointer $b^{11}$ of wheel $b^2$ indicates tens, and pointer $b^{12}$ of wheel $b^3$ indicates hundreds, thus making a register of any number less than one thousand readily practicable.

As represented in the drawings, the register indicates seven hundred and forty-two, $b^{12}$ indicating the seven hundred, $b^{11}$ the forty, and $b^{10}$ the two.

I claim as new and desire to secure by Letters Patent—

1. The combination, in automatic grain-meters, of quadrantal compartments on a horizontal shaft, a block on said shaft square in vertical outline, a weighted scale-beam having its power end resting against the under side of said block, and a trip-plate located under the grain-discharge and pivoted to impinge against the rotating partitions, as set forth.

2. Casing $a$ of grain-weighing mechanism, elevator $e\,i$, having removable portion $h$, upper conveyer, $d$, and lower conveyer, $k$, all constructed and arranged to operate as set forth.

3. In a registering device for grain-weighing mechanism, the combination of toothed wheel $b'$, having lateral tooth $b^5$, double-faced pinion $b^6$, having lateral tooth $b^7$, wheel $b^2$, in mesh with pinion $b^6$, and wheel $b^3$, adapted to be operated by tooth $b^7$, the said wheels $b'$, $b^2$, and $b^3$ being respectively provided with indicating-pointers $b^{10}$, $b^{11}$, and $b^{12}$, as set forth.

WILBER R. DUNKEL.

Witnesses:
C. C. CLARK,
J. E. NICHOLS.